E. TARBOX.
Velocipede.
No. 105,739.                              Patented July 26, 1870.
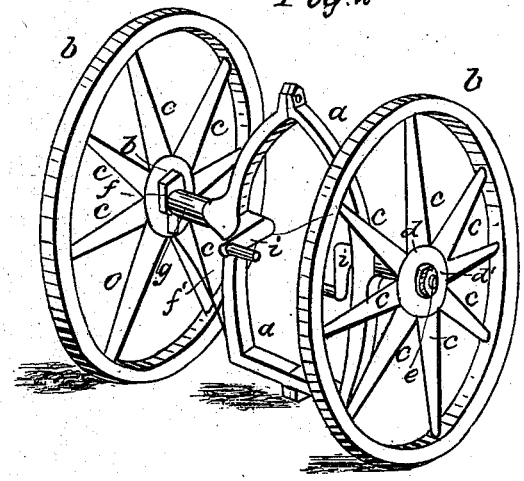
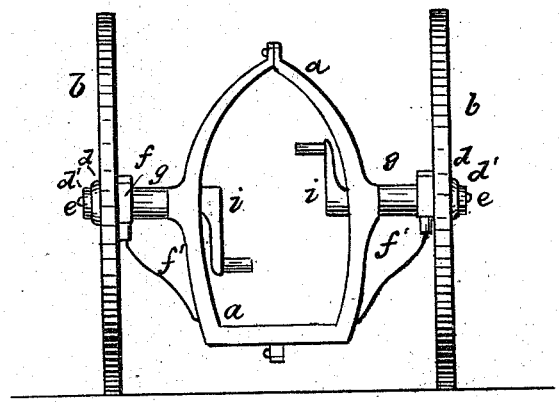
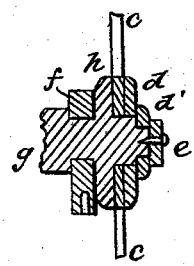
Witnesses
James F. Pickering
Jeremiah L. Newton
Inventor
Ephraim Tarbox

UNITED STATES PATENT OFFICE.

EPHRAIM TARBOX, OF CHARLESTOWN, MASSACHUSETTS.

IMPROVEMENT IN VELOCIPEDES.

Specification forming part of Letters Patent No. 105,739, dated July 26, 1870.

*To all whom it may concern:*

Be it known that I, EPHRAIM TARBOX, of Charlestown, in the county of Middlesex and State of Massachusetts, have invented a new and Improved Vehicle, of which the following is a specification:

The invention relates to a vehicle which may be propelled by human power, as a velocipede, or drawn by horses or like method of propulsion; and has for its object speed, pleasure, comfort, and safety in traveling.

The body of the vehicle hangs between and is attached to two axles, which are independent of each other, each wheel and axle being firmly joined and turning together, while the frame or body hangs perpendicularly between them, and is supported both by the axles or ends of the axles, on each side, passing through the sides of the frame or body, and chiefly by supports operating as boxes and embracing the axles next to the wheels, and which supports are attached to the body of the vehicle, thereby sustaining chiefly the weight to be carried. The wheels have fellies made in the ordinary way, and into which the spokes enter, but there is no hub as ordinarily constructed. The spokes converge to and are made solid with the hub, and are of the usual thickness of spokes. Through the center of the wheel passes the axle, the same being square in form, and, consequently, the hole is cut square in the wheel. On the square end of the axle, outside of the wheel-hub, is fitted a washer or two washers, which are screwed tight to the wheel by the screws entering the axles, so that, when the wheel turns, the axle, washer, &c., turn with it. On the inside of the thin hub is a washer, being a part of or fastened to the axle, corresponding to the washer on the outside of the wheel. Next to this solid washer is the box, with its extended part supporting the frame or body of the vehicle, which box and extended part operate like an axle, and to which may be attached the thills when the vehicle is to be propelled by horses.

The form of the body or frame is elliptical, with its lower part truncated, for the purpose of giving a place to stand upon, or constructing a box or body upon, to sit in, and in height is somewhat less than the diameter of the wheels.

The two axles coming through the sides of the frame opposite to each other have cranks attached to them, so that the operator may stand or sit upon the frame, and propel the vehicle with the cranks. Or other arrangement may be made and attached to the axles, and the vehicle may be propelled by a treadle or other contrivance.

In the accompanying drawing, Figure 1 is a perspective view of the vehicle. Fig. 2 is an elevation of the same; and Fig. 3 is a section of the hub, washers, axles, &c., of the same.

The letters $a\ a$ represent the body or frame; $b\ b$, the wheels; and $c\ c\ c$, &c., spokes of the wheels; $d\ d$ and $d'\ d'$, outside washers attached to the axles; $e\ e$, screws to hold on the washers; $f\ f$, supports or boxes attached to and embracing the axles; and $f'\ f'$, their connections with the frame or body; $g\ g$, the independent axles; $h\ h$, the fixed washers to the axles; and $i\ i$, the propelling-cranks.

The frame or body $a\ a$ (seen in Figs. 1 and 2 in the accompanying drawing) is made of wood or any suitable material, and hangs supported by the axles $g\ g$, as seen in said drawing. Used as a velocipede, its height should be sufficient for a person to stand in, or the bottom should be about three feet from the axle. Upon the bottom of the frame may be fastened, if desirable, a body or box; and if the same is to be used for a carriage to be drawn by horses, the body or frame, of course, can be extended into a carriage, simply removing the cranks, and putting nuts or washers in their place, and attaching the thills to the boxes or supports $f\ f$. The wheels are made of wood or metal, cast in one piece, or malleable metal; and square holes are made at the center, and then they are fastened upon the axles, as seen in said drawing and in Fig. 3.

It will also be perceived, by the last figure mentioned, that the real hub of the wheel is made of the outside washers $d\ d$ and $d'\ d'$ and the washers $h\ h$, which are a part of the axles $g\ g$, and that the wheels so constructed and the axles are turned by the cranks $i\ i$, all being fastened together as one piece, and that the body or frame hangs upon the axles $g\ g$ chiefly at the points of the boxes or supports $f\ f$. The frame, of course, may be brought nearer to the boxes or supports $f\ f$ than represented in the drawing, and may also be of different shape. The raised parts of the axles between the projecting part of the frame may be shortened or entirely removed. Also, a third wheel may be used under the central part of the frame, and attached so as to rotate in any direction when the vehicle is to be turned around. The axles being independent of each other, of course one wheel may be made to rotate rapidly in turning round, while the other is held in check.

The wheels may be made of considerable diameter, and, consequently, with the same power applied, great speed, as in a velocipede, may be obtained; and the weight chiefly resting upon the axles near the wheels, less power will be required to propel the vehicle.

The wheels constructed in this way are light and simple in construction, and the vehicle, whether used as a velocipede or other kind of carriage, is simple in construction, and may be made of great efficiency and usefulness.

I claim—

The combination and arrangement of the body or frame $a\ a$ with the axles $g\ g$, the supports or boxes $f\ f$, and their extended supports $f'\ f'$, the boxes being outside of the wheel-hub, and, with their extended supports, operating as an axle to the vehicle, the wheels $b\ b$, the washers $d\ d$ and $d'\ d'$, with the screws or fastenings $e\ e$, combined, arranged, with the axles $g\ g$, having fixed washers $h\ h$, all of the several parts of the vehicle being combined and arranged and operated substantially in the manner and for the purpose specified.

EPHRAIM TARBOX.

Witnesses:
JAMES F. PICKERING,
J. L. NEWTON.